US011893059B2

United States Patent
Hanganu et al.

(10) Patent No.: US 11,893,059 B2
(45) Date of Patent: Feb. 6, 2024

(54) METHOD, APPARATUS, AND NON-TRANSITORY COMPUTER-READABLE STORAGE MEDIUM FOR DETERMINING A STRENGTH OF AN IDENTIFIER RECORD

(71) Applicant: Camelot UK Bidco Limited, London (GB)

(72) Inventors: Mihnea Hanganu, Berchem-Sainte-Agathe (BE); Robert Davey, London (GB); Robert Anthony Reading, St John's Wood (GB); Edmond Darren White, Buckinghamshire (GB); Vasheharan Kanesarajah, Ruislip (GB)

(73) Assignee: Camelot UK Bidco Limited, London (GB)

( * ) Notice: Subject to any disclaimer, the term of this patent is extended or adjusted under 35 U.S.C. 154(b) by 44 days.

(21) Appl. No.: 17/680,534

(22) Filed: Feb. 25, 2022

(65) Prior Publication Data
US 2022/0277046 A1   Sep. 1, 2022

Related U.S. Application Data

(60) Provisional application No. 63/154,510, filed on Feb. 26, 2021.

(51) Int. Cl.
*G06F 16/90* (2019.01)
*G06F 16/901* (2019.01)
(Continued)

(52) U.S. Cl.
CPC ........ *G06F 16/9024* (2019.01); *G06F 16/906* (2019.01); *G06F 16/908* (2019.01); *G06F 16/90344* (2019.01)

(58) Field of Classification Search
CPC .......... G06F 16/9024; G06F 16/90344; G06F 16/906; G06F 16/908
See application file for complete search history.

(56) References Cited

U.S. PATENT DOCUMENTS

2008/0270203 A1   10/2008   Holmes et al.
2011/0225019 A1   9/2011   Taylor et al.
(Continued)

OTHER PUBLICATIONS

International Search Report and Written Opinion dated May 19, 2022 in PCT/IB2022/051696, 15 pages.

*Primary Examiner* — Kristopher Andersen
(74) *Attorney, Agent, or Firm* — Oblon, McClelland, Maier & Neustadt, L.L.P.

(57) ABSTRACT

A method, apparatus, and computer-readable storage medium that generate, from a database, an identifier record grouping including the identifier record and at least one other identifier record, generate one or more strength indicators of the generated identifier record grouping, normalize a value of each of the one or more strength indicators based on an average value associated with the respective strength indicator, generate a value of a strength metric of the generated identifier record grouping based on a sum of the normalized values of the one or more strength indicators, rank the value of the strength metric amongst values of strength metrics associated with a plurality of identifier record groupings within the database, and determine a strength score of the generated identifier record grouping as the strength score of the identifier record based on the ranking.

15 Claims, 6 Drawing Sheets

(51) Int. Cl.
*G06F 16/903* (2019.01)
*G06F 16/906* (2019.01)
*G06F 16/908* (2019.01)

(56) References Cited

U.S. PATENT DOCUMENTS

| | | |
|---|---|---|
| 2013/0325550 A1* | 12/2013 | Varghese ........... G06Q 30/0202 705/7.31 |
| 2014/0280104 A1 | 9/2014 | Summerfield |
| 2016/0132979 A1 | 5/2016 | Schneller et al. |
| 2017/0061448 A1* | 3/2017 | Akkiraju ................ G06Q 30/02 |
| 2018/0268038 A1 | 9/2018 | Keyngnaert et al. |
| 2018/0336285 A1 | 11/2018 | Amdur et al. |
| 2020/0042941 A1 | 2/2020 | Summerfield |

* cited by examiner

| Rank | Brand | Owner | First filed year | |
|---|---|---|---|---|
| 1 | MITSUBISHI | MITSUBISHI CORPORATION | 1920 | 111 |
| 2 | DUNHILL | ALFRED DUNHILL LIMITED | 1934 | 111 |
| 3 | EXXON | EXXON MOBIL CORPORATION | 1966 | 111 |
| 4 | MAZDA | MAZDA MOTOR CORPORATION | 1910 | 111 |
| 5 | SHELL | SHELL BRANDS INTERNATIONAL AG | 1900 | 111 |
| 6 | ZIPPO | ZIPPO MANUFACTURING COMPANY | 1934 | 110 |
| 7 | SKF | AKTIEBOLAGET SKF | 1913 | 110 |
| 8 | 3M | 3M COMPANY | 1942 | 110 |
| 9 | CASTROL | CASTROL LIMITED | 1906 | 101 |
| 10 | PHILIPS | KONINKLIJKE PHILIPS N.V. | 1936 | 101 |
| 11 | KODAK | EASTMAN KODAK COMPANY | 1891 | 101 |
| 12 | ICI | IMPERIAL CHEMICAL INDUSTRIES LIMITED | 1930 | 101 |
| 13 | ICI | IMPERIAL CHEMICAL INDUSTRIES PLC | 1930 | 101 |
| 14 | DOW | THE DOW CHEMICAL COMPANY | 1935 | 101 |
| 15 | FMC | FMC CORPORATION | 1933 | 101 |
| 16 | YAMAHA | YAMAHA CORPORATION | 1928 | 101 |
| 17 | ESSO | EXXON MOBIL CORPORATION | 1933 | 101 |
| 18 | SIEMENS | SIEMENS AKTIENGESELLSCHAFT | 1931 | 101 |
| 19 | SONY | SONY CORPORATION | 1932 | 101 |
| 20 | FORD | FORD MOTOR COMPANY | 1909 | 101 |
| 21 | KOHLER | KOHLER CO. | 1913 | 101 |
| 22 | BOSCH | ROBERT BOSCH GMBH | 1929 | 101 |
| 23 | BOEING | THE BOEING COMPANY | 1942 | 101 |
| 24 | CHEVRON | CHEVRON INTELLECTUAL PROPERTY LLC | 1987 | 101 |
| 25 | GE | GENERAL ELECTRIC COMPANY | 1899 | 101 |
| 26 | IBM | INTERNATIONAL BUSINESS MACHINES CORPORATION | 1948 | 101 |
| 27 | GUCCI | GUCCIO GUCCI S.P.A. | 1968 | 100 |
| 28 | BMW | BAYERISCHE MOTOREN WERKE AKTIENGESELLSCHAFT | 1917 | 100 |
| 29 | SUZUKI | SUZUKI MOTOR CORPORATION | 1962 | 99 |
| 30 | YKK | YKK CORPORATION | 1962 | 99 |
| 31 | MERCEDES BENZ | DAIMLER AG | 1925 | 92 |
| 32 | PANASONIC | PANASONIC CORPORATION | 1955 | 91 |
| 33 | CATERPILLAR | CATERPILLAR INC. | 1910 | 91 |
| 34 | BAYER | BAYER AKTIENGESELLSCHAFT | 1908 | 91 |
| 35 | DANONE | COMPAGNIE GERVAIS DANONE | 1963 | 91 |
| 36 | CANON | CANON KABUSHIKI KAISHA | 1952 | 91 |
| 37 | ESPRIT | ESPRIT INTERNATIONAL | 1995 | 91 |
| 38 | VISA | VISA INTERNATIONAL SERVICE ASSOCIATION | 1975 | 91 |
| 39 | NEC | NEC CORPORATION | 1950 | 91 |
| 40 | SUNKIST | SUNKIST GROWERS, INC. | 1908 | 91 |
| 41 | COCA-COLA | THE COCA-COLA COMPANY | 1916 | 91 |
| 42 | GOODYEAR | THE GOODYEAR TIRE & RUBBER COMPANY | 1918 | 91 |
| 43 | AMWAY | ALTICOR INC. | 1960 | 91 |
| 44 | BROTHER | BROTHER INDUSTRIES, LTD. | 1930 | 91 |
| 45 | HONDA | HONDA MOTOR CO., LTD. | 1960 | 91 |
| 46 | RICOH | RICOH COMPANY, LTD. | 1966 | 91 |
| 47 | LEGO | LEGO JURIS A/S | 1953 | 91 |
| 48 | HERMES | HERMES INTERNATIONAL | 1927 | 91 |
| 49 | FERRARI | FERRARI S.P.A. | 1967 | 91 |
| 50 | ROLEX | ROLEX SA | 1915 | 91 |

METHOD, APPARATUS, AND NON-TRANSITORY COMPUTER-READABLE STORAGE MEDIUM FOR DETERMINING A STRENGTH OF AN IDENTIFIER RECORD

CROSS-REFERENCE TO RELATED APPLICATIONS

The present application claims priority to U.S. Provisional Application No. 63/154,510, filed on Feb. 26, 2021, the entire content of which is incorporated by reference herein in its entirety for all purposes.

BACKGROUND

Field of the Disclosure

The present disclosure relates to methods for determining a strength of an identifier record.

Description of the Related Art

As global intellectual property (IP) and innovation landscapes change rapidly, the ability for organizations to leverage 'smart IP data' is increasingly important. To this end, however, analytics and visualization are inhibited by quality and breadth of the underlying data. Thus, certain derived metrics of IP data can serve as useful analogs that allow for concise and efficient data visualization.

Regarding these derived metrics and other unique benchmarks, little progress has been made as it relates to trademarks. For instance, though certain efforts have been made to evaluate a value of a trademark, for example a so-called top-down approach, there are no objective measures that evaluate the value of the trademark from the ground up. The ground up approach would consider, in one aspect, trademark fundamentals as the derived metrics of the trademark. However, to this point, such an approach does not exist.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure includes a method for determining a strength score of an identifier record. In the method, an identifier record grouping including the identifier record and at least one other identifier record is generated from a database. Each identifier record in the identifier record grouping is associated with a same brand. One or more strength indicators of the generated identifier record grouping are generated. The one or more strength indicators include at least one of a persistence indicator, a market indicator, a jurisdictional coverage indicator, or a distinction indicator. A value of each of the one or more strength indicators is normalized based on an average value associated with the respective strength indicator. The average value associated with the respective strength indicator is determined based on a plurality of identifier record groupings within the database including the generated identifier record grouping. A value of a strength metric of the generated identifier record grouping is generated based on a sum of the normalized values of the one or more strength indicators of the generated identifier record grouping. The value of the strength metric of the generated identifier record grouping is ranked amongst values of strength metrics associated with the plurality of identifier record groupings within the database. Based on the ranking, a strength score of the generated identifier record grouping is determined as the strength score of the identifier record.

In an embodiment, an improvement recommendation is determined for at least one of the one or more strength indicators of the generated identifier record grouping based on the strength score of the generated identifier record grouping being less than a strength score of a highest ranking identifier record grouping in the plurality of identifier record grouping.

In an embodiment, the improvement recommendation is displayed by a user interface of an electronic device communicatively coupled with a server via a network.

In an embodiment, the identifier record is determined based on an input from an electronic device.

In an embodiment, the input is a textual string or an image.

In an embodiment, the persistence indicator is an average age of trademark registrations associated with the generated identifier record grouping.

In an embodiment, the market indicator is at least one of an economic footprint of the generated identifier record grouping or an industry footprint of the generated identifier record grouping.

In an embodiment, the jurisdictional coverage indicator is a number of registered jurisdictions normalized by a total number of jurisdictions within the database. Trademarks associated with the generated identifier record grouping are registered in the number of registered jurisdictions.

In an embodiment, the distinction indicator is a distinctiveness of a representative identifier record of the generated identifier record grouping.

In an embodiment, the economic footprint of the generated identifier record grouping is determined by weighting the number of registered jurisdictions based on a respective gross domestic product for each of the registered jurisdictions.

In an embodiment, the industry footprint of the generated identifier record grouping is determined by calculating a market share of the generated identifier record grouping, the market share being defined as a percentage of a class of a Nice Classification that the trademarks associated with the generated identifier record grouping occupy within a given jurisdiction, and further by calculating a number of different classes of the Nice Classification that the trademarks associated with the generated identifier record grouping are registered in within the given jurisdiction.

In an embodiment, the representative identifier record is associated with a textual string. The distinctiveness of the representative identifier record of the generated identifier record grouping is determined by weighting the representative identifier record by a length of the associated textual string, and further by calculating a string similarity measure of the associated textual string relative to other textual strings associated with other identifier records within the database, the other identifier records within the database being identifier records not associated with the generated identifier record grouping.

The present disclosure includes an apparatus for determining a strength score of an identifier record. The apparatus includes processing circuitry that generates, from a database, an identifier record grouping including the identifier record and at least one other identifier record, each identifier record in the identifier record grouping being associated with a same brand. The processing circuitry generates one or more strength indicators of the generated identifier record grouping. The one or more strength indicators include at least one of a persistence indicator, a market indicator, a jurisdictional coverage indicator, or a distinction indicator. The processing circuitry normalizes a value of each of the one or more strength indicators based on an average value associated with the respective strength indicator. The average value associated with the respective strength indicator is determined based on a plurality of identifier record groupings within the database including the generated identifier record grouping. The processing circuitry generates a value of a strength metric of the generated identifier record grouping based on a sum of the normalized values of the one or more strength indicators of the generated identifier record grouping. The processing circuitry ranks the value of the strength metric of the generated identifier record grouping amongst values of strength metrics associated with the plurality of identifier record groupings within the database. The processing circuitry determines a strength score of the generated identifier record grouping as the strength score of the identifier record based on the ranking.

The present disclosure includes a non-transitory computer-readable storage medium storing computer-readable instructions that, when executed by a computer for determining a strength score of an identifier record, cause the computer to perform generating, from a database, an identifier record grouping including the identifier record and at least one other identifier record, each identifier record in the identifier record grouping being associated with a same brand, generating one or more strength indicators of the generated identifier record grouping, the one or more strength indicators including at least one of a persistence indicator, a market indicator, a jurisdictional coverage indicator, or a distinction indicator, normalizing a value of each of the one or more strength indicators based on an average value associated with the respective strength indicator, the average value associated with the respective strength indicator being determined based on a plurality of identifier record groupings within the database including the generated identifier record grouping, generating a value of a strength metric of the generated identifier record grouping based on a sum of the normalized values of the one or more strength indicators of the generated identifier record grouping, ranking the value of the strength metric of the generated identifier record grouping amongst values of strength metrics associated with the plurality of identifier record groupings within the database, and determining a strength score of the generated identifier record grouping as the strength score of the identifier record based on the ranking.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is a tabular representation of a ranking, according to an exemplary embodiment of the present disclosure.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Coverage, strength, background, and prospects of brands belonging to companies and organizations are important factors for evaluating markets and competitive landscapes. For instance, certain brands and trademarks are more valuable than other brands and trademarks. Further, it can be appreciated that, as it relates to intangible assets, evaluating their value is a complex yet important task. Some companies, considering the increasing importance of their intangible assets, can provide brand valuation as an insight for commercial strategy as well as a practice to track, manage, and validate transactions. Because of externalities that affect the perception and relevance of brands (e.g., the competitive position of the company or product, the perception of potential customers, the nature of the industry), as well as the unpredictability of future business and market performance, such brand valuations often rely on subjective metrics and assumptions or are based purely on business-output metrics such as revenues, expenses, and the like.

Appreciating that present subjective brand valuation tools are inadequate, one may consider trademarks and trademark registrations as an avenue for objectively evaluating a brand by evaluating the intensity and efficiency with which trademark owners are protecting their brands.

Unfortunately, there presently exist no practical and objective methods for determining the difference between a strong trademark and a weak trademark. In some related arts, users who want to draw insight from global data sources are then left to, if capable, performing their own statistical modeling, data manipulation, data restructuring, and manual cleaning on data sources from different platforms and across multiple jurisdictions. For instance, if a human were to attempt this approach manually, 80 million calculations would need to be performed on multiple independent occasions, the calculations totaling more than 500 million calculations in total. Only after more than 500 million calculations would an evaluation of one trademark or trademark family be possible. Assuming the person responsible for the computations was experienced, wherein one calculation can be performed in five minutes, the evaluation would still require 4,656 years of computations. Given this time requirement, and the fact that the evaluations of the trademarks would need to be updated daily to incorporate new trademark registrations that occur each day worldwide, the computational lift for this approach is enormous. Thus, it is unlikely for an individual, a small firm, or even a large company, to be able to dedicate the resources necessary to build such an objective and analytical tool.

The present disclosure provides methods for determining a strength score of a brand.

In an embodiment, an objective tool is provided for analyzing varied data sources to determine a strength score of a brand based on trademark registrations. The objective tool includes a method for restructuring data to allow for trademark family based metrics. The analysis can include evaluation of intangible assets according to defined metrics that can be scored. For example, the analysis can evaluate whether the trademark is well protected globally, whether the trademark is invested in by the owner, and/or whether the trademark is impactful. The scored metrics can then be incorporated into analytical models to determine the strength score of the brand.

In an embodiment, the present disclosure allows for comparing all trademark registrations filed worldwide, comparing trademark registrations by trademark family, and generating exhaustive reports that do not exclude companies based on their legal form or geographical presence. The objective tool of the present disclosure relies on official data that includes information on all trademark registrations filed worldwide by any trademark owner, which can be public companies, private companies, or individuals.

In an embodiment, the present disclosure describes an empirical approach to measuring distinctiveness, market footprint, and impact of a trademark.

According to an embodiment, the present disclosure describes methods for determining a strength score of a brand based on trademark registrations. The strength score can be determined based on one or more factors of a particular trademark or a particular brand having one or more related trademarks.

In an embodiment, the one or more factors can be one or more strength indicators and may include persistence, a market footprint, jurisdictional coverage, and distinctiveness and complexity for example.

The persistence can be a measure of an average age of trademark registrations related to a certain brand. A higher average age can indicate it is more likely the brand is well known and, accordingly, stronger.

The market footprint includes an economic footprint and/or an industry footprint of an entity. The economic footprint can be a measure of breadth of investment made, in total, in a given brand, based on the trademark registrations. This measure may include a combination of two sub-metrics. A first sub-metric, which relates to the investment, includes a determined total number of jurisdictions in which an identifier record (or an identifier record grouping) associated with the brand has been registered. Described in detail later, each identifier record can be a textual string in any character set or an image associated with the brand. The identifier record grouping can be a collection of identifier records that used to define a same brand and thus define a trademark family. For simplicity, the remainder of the disclosure will consider the identifier record as a textual string. Subsequent reference to an identifier record may be, interchangeably, a reference to an alphanumeric string as the textual string. While the first sub-metric relates to jurisdictional costs, a second sub-metric includes a determined total number of jurisdictions, weighted for gross domestic product (GDP), in which the identifier record (or the identifier record grouping) has been registered. The second sub-metric correlates with the market footprint based on which jurisdictions the trademarks are protected in. The industry footprint can be a measure of penetration and cross-market applicability of the brand, for example based on Nice Classifications, and may combine two measures. The Nice Classification, as would be understood by one of ordinary skill in the art, is an international classification of goods and services applied for the registration of marks. The first measure includes a determination of a percentage of a class of the Nice Classification that an identifier record occupies within a given jurisdiction. This percentage serves as a measure of market share. The second measure includes a determination of how many different classes of the Nice Classification the identifier record (e.g., an alphanumeric string) has successfully been registered across in a given jurisdiction.

The distinctiveness and complexity can be a measure of how distinct a given identifier record (or identifier record grouping) is relative to other identifier records (or identifier record groupings) within a database of trademark registrations, each trademark registration in the database corresponding to an identifier record and/or being associated with an identifier record grouping. When the identifier record groupings are considered, trademark registrations from the same brand may be excluded. To determine how unique the brand is, an alphanumeric string associated with the identifier record, or a representative alphanumeric string representative of the identifier record grouping is first weighted by a length of the alphanumeric string or the representative alphanumeric string. Longer strings are, inherently, more unique than shorter strings. A string similarity algorithm can then be applied to determine how similar a given alphanumeric string is from the other alphanumeric strings within the database. In an embodiment, the string similarity algorithm may be an edit distance measure. In an embodiment, the string similarity algorithm may be a Jaro-Winkler edit distance measure, a Sorenson-Dice algorithm, or the like. In an example, the string similarity algorithm is a string similarity algorithm that is executed for an alphanumeric string associated with each identifier record or for a representative alphanumeric string associated with an identifier record grouping, the algorithm including a comparison of the alphanumeric string or the representative alphanumeric string against a random sample (e.g., 0.15%) of all identifier records (i.e., trademark registrations) within a database.

In an embodiment, the one or more strength indicators can further include market interest. The market interest can be a measure of how popular a given identifier record (or identifier record grouping) is with the general public. For instance, the measure may indicate how popular the identifier record is with a specific jurisdiction at any selected time frame. Such data may be based on search trends in a search engine, for instance.

Values of the one or more strength indicators can then be used to determine a strength score of a brand. The strength score can be determined by first normalizing the value of each of the one or more strength indicators to a global average of the respective strength indicator and then generating a value of the strength score or strength metric by summing the normalized values associated with the one or more strength indicators for the identifier record (or identifier record grouping).

In other words, the values of the one or more strength indicators do not go directly into the brand strength score. Instead, each value is compared to a respective baseline average across all of the data. In an example, each value may be normalized to the respective baseline average. In another example, each value may be normalized to the respective baseline average and then be assigned a point based on a determined distance from the respective baseline average. The assigned point per strength indicator can then be summed to form the strength score. A strong brand is a band with a high strength score.

In an embodiment, the objective analysis performed above can consider different sectors, companies, and countries.

Figure 1:
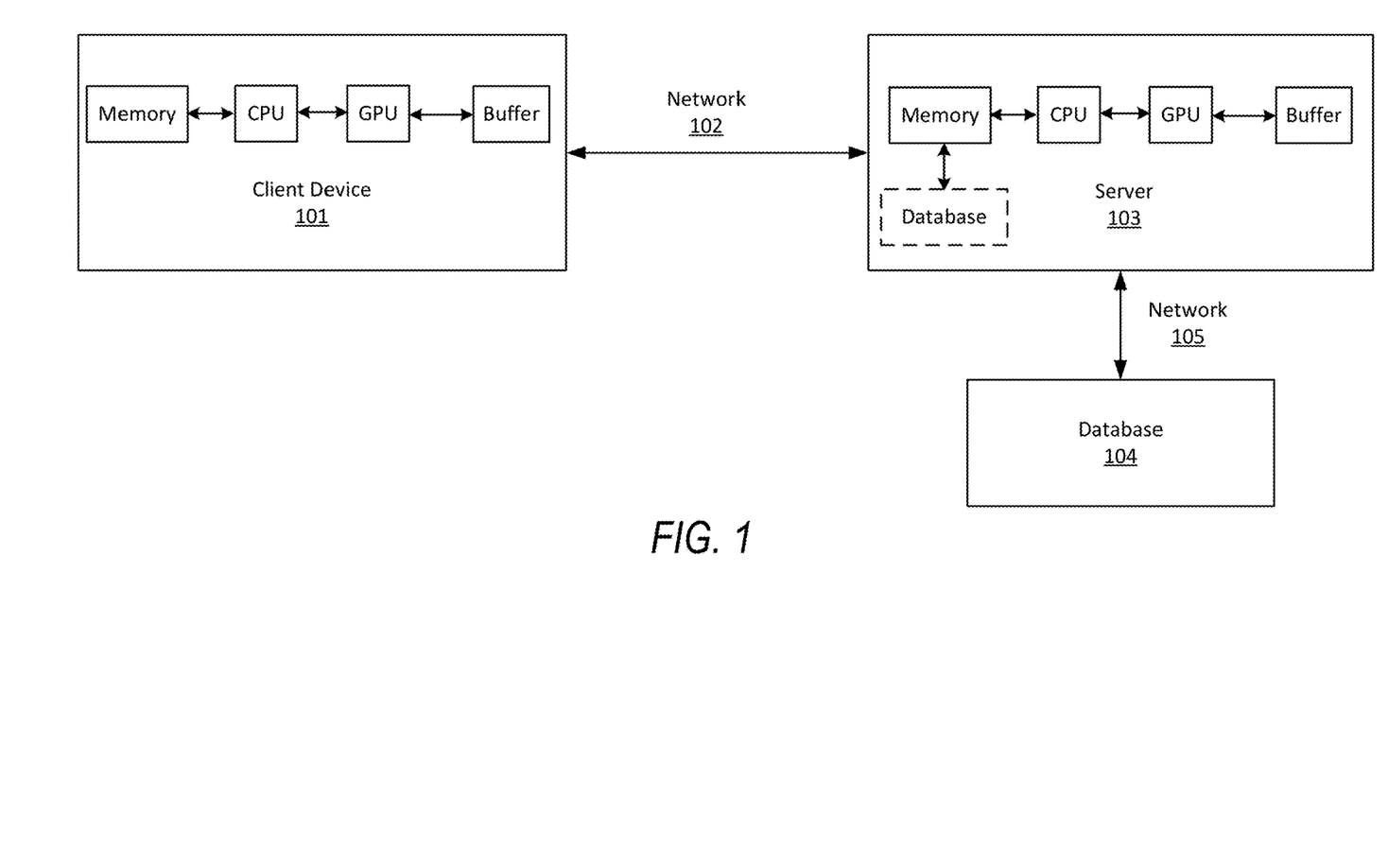
FIG. 1 is a schematic view of a client device communicatively connected via a network to a server according to an embodiment of the present disclosure.

Referring now to the figures, FIG. 1 is a schematic view of an electronic device, such as a client/user device (a first device 101) communicatively connected, via a network 102, to a second electronic device, such as a server (a second device 103), according to an embodiment of the present disclosure. Further, although FIG. 1 shows only one client/user device, in an embodiment, additional client/user devices can be communicatively connected to both the first device 101 and the second device 103. For example, a second client/user device can be communicatively connected to the first device 101 and the second device 103, or a plurality of the client/user devices can be communicatively connected to the first device 101 and the second device 103.

An application may be installed or accessible on the first device 101 for executing the methods described herein. The application may also be integrated into the operating system (OS) of the first device 101. The first device 101 can be any electronic device such as, but not limited to, a personal computer, a tablet, a smart-phone, a smart-watch, a smart-television, an interactive screen, a smart projector or a projected platform, an IoT (Internet of things) device or the like.

As illustrated in FIG. 1, the first device 101 includes a central processing unit (CPU), a graphics processing unit (GPU), a main memory, and a buffer (frame buffer, audio buffer, etc.), among other components (discussed in more detail in FIG. 7). In an embodiment, the first device 101 can call graphics that are displayed on a display. The graphics of the first device 101 can be processed by the GPU and rendered in scenes stored on the buffer, such as a frame buffer, that is coupled to the display. In an embodiment, the first device 101 can run software applications or programs that are displayed on a display. In order for the software applications to be executed by the CPU, they can be loaded into the main memory, which can be faster than a secondary storage, such as a hard disk drive or a solid state drive, in terms of access time. The main memory can be, for example, random access memory (RAM) and is physical memory that is the primary internal memory for the first device 101.

The CPU can have an associated CPU memory and the GPU can have an associated video or GPU memory. The frame buffer may be an allocated area of the video memory. The GPU can display the data pertaining to the software applications. It can be understood that the CPU may have multiple cores or may itself be one of multiple processing cores in the first device 101. The CPU can execute commands in a CPU programming language such as C++. The GPU can execute commands in a GPU programming language such as High-Level Shading Language (HLSL). The GPU may also include multiple cores that are specialized for graphic processing tasks. Although the above description was discussed with respect to the first device 101, it is to be understood that the same description applies to the second device 103 of FIG. 1. Further, the second device 103 can include a database and/or be coupled with a database 104 via a network 105 in certain embodiments.

Figure 2:
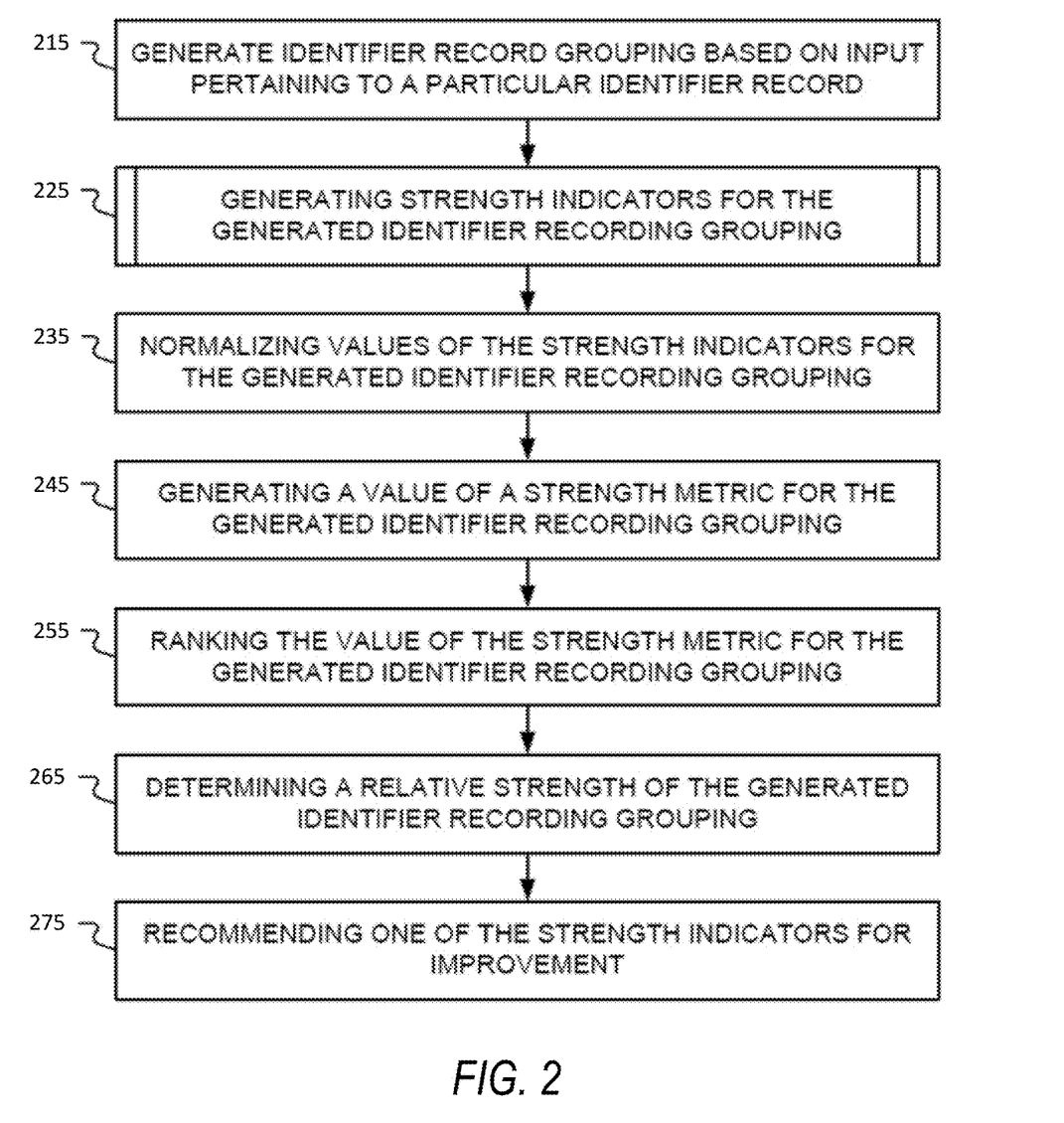
FIG. 2 is a flow diagram of a method of determining a strength score of a brand according to an exemplary embodiment of the present disclosure.

FIG. 2 is a flow diagram of a method for determining a strength score of a brand based on trademark registrations according to an embodiment of the present disclosure. In one embodiment, the method can be performed by the server 103 in FIG. 1. In one embodiment, the method can be performed by the first device 101 or a combination of the first device 101 and the server 103. In the method, it is assumed that a user, for instance, has provided input to a user device (e.g., the first device 101 in FIG. 1) that indicates the brand for assessment. The input may be a name of a company, a name of a brand, a particular trademark registration, or the like.

The indication of the brand may include identification of a particular identifier record that the user is interested in. The particular identifier record may be a trademark registration such as a textual string in any character set or an image. In an embodiment, it is assumed that the trademark registration is a textual string (e.g., an alphanumeric string), and more than one trademark registration is associated with the trademark registration.

At step 215, an identifier record grouping can be generated based on the particular identifier record. The grouping allows for slightly different but related trademark registrations to be associated with the same brand. For instance, though a variety of trademark registrations may be owned by the same entity, each of the variety of trademark registrations, which can be alphanumeric strings, can have typographical errors and translation errors, as well as minor variations based on regional differences. For instance, corporate suffixes may be different in different regions or jurisdictional areas.

In an embodiment, step 215 can be performed by associating identifier records within a database based on owner names. The association can be performed by using a machine learning algorithm, can be rules based, and can include manual evaluation. Data within the database may be global trademark registration data. The information can include a number of registration classes that the trademarks are registered within in a given jurisdiction, relevant statistics related to an economic output of the given jurisdiction, and market dynamics within the given jurisdiction. The identifier records with similar trademark registrations are grouped to represent the same brand for the purposes of assessing a strength of the brand. In other words, the database may include identifier records associated with unique trademarks registered globally. Accordingly, step 215 allows for grouping of identifier records that pertain to a same brand.

At step 225, one or more strength indicators can be calculated for the generated identifier record grouping. The one or more strength indicators may include a persistence indicator, a market indicator, a jurisdictional indictor, and/or a distinction indicator.

In an embodiment, the persistence indicator may be determined as an average age of trademark registrations associated with the generated identifier record grouping. For instance, for each trademark registration associated with the generated identifier record grouping, a normalized filing date can be created. The normalized filing date considers individual jurisdiction/region/national rules and allows for extraction of a useful actual or estimated date the trademark registration was filed. Next, an average difference between the normalized filing date and the present day may be calculated as the average age of the trademark registration. The calculations may be performed for each identifier record associated with the generated identifier record grouping. Notably, as the persistence indicator relies on the 'present day', a resulting average of trademark registrations associated with the generated identifier record grouping is only valid for the day the calculation is performed.

Figure 4:
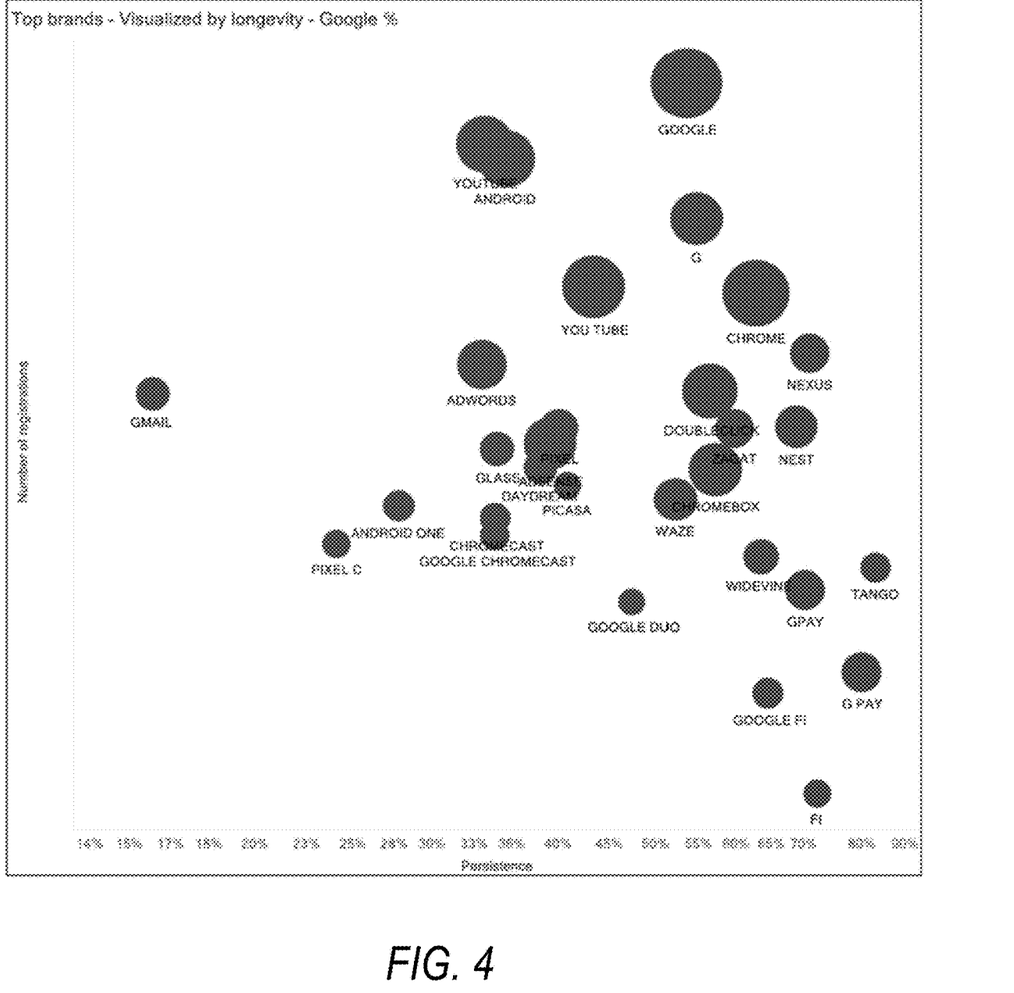
FIG. 4 is a graphical representation of a strength indicator according to an exemplary embodiment of the present disclosure.

In an embodiment, the average age of the trademark registrations can be normalized based on average ages of remaining identifier record groupings within the database. Accordingly, after calculating an average age of each of the remaining identifier record groupings within the database (i.e., an average age of every other trademark family in the database), the average age of the generated identifier record grouping can be normalized based on the average ages of the remaining identifier record groupings, and be assigned a score of 0 to 1. Accordingly, FIG. 4 provides a graphical illustration of longevity of Google trademark registrations.

In an embodiment, the market indicator may be an economic footprint associated with the generated identifier record grouping and/or an industry footprint associated with the generated identifier record grouping. The economic footprint may be calculated by, first, determining a number of jurisdictions in which the trademarks associated with the generated identifier record grouping are registered, and, second, weighting the determined number of jurisdictions in which the trademarks are registered according to a respective GDP for each of the jurisdictions in which the trademarks are registered. The industry footprint may be determined by, first, calculating a market share of the trademark registrations associated with the generated identifier record grouping, the market share being defined as a percentage of a class of a Nice Classification that the trademark registrations occupy within a given jurisdiction, and, second, calculating the number of different classes of the Nice Classification that the trademarks are registered in within the given jurisdiction.

In an embodiment, the Nice Classifications in each jurisdiction, across all global trademark data, provides a denominator. Accordingly, the market indicator can be calculated by dividing a number of trademark registrations associated with the generated identifier record grouping by a number of existing trademarks registered in a specific class of the Nice Classification in a given jurisdiction. This calculation can be made for every relevant trademark registered in the Nice Classification in a country. This calculation can then be weighted by GDP, as introduced above.

In an embodiment, the jurisdictional indicator can be determined as an indicator of trademark coverage or brand exposure. For instance, for the generated identifier record grouping, a corresponding number of jurisdiction registrations can be calculated. This calculation includes consideration for regional trademark registrations and splitting out distinct coverage of registration for individual member states of the region. The calculated coverage can then be considered as a normalization of the jurisdiction registrations by a total number of possible jurisdictions considered in the database.

In an embodiment, the distinction indicator may be determined as a measure of how distinct an alphanumeric string of an identifier record, or a representative alphanumeric string of the generated identifier record grouping, is relative to other alphanumeric strings associated with other identifier records or other representative alphanumeric strings associated with other identifier record groupings within the database. The measure of the distinction indicator may be, for an alphanumeric string or a representative alphanumeric string, determined by first weighting the string by a length of the string and then calculating a string similarity measure of the string relative to other strings within the database. The string similarity measure may be a string similarity algorithm that may be applied to determine how different given alphanumeric strings, and hence trademark registrations, are from one another. In an example, the string similarity algorithm may be a Jaro-Winkler measure, among other relevant techniques. For instance, the string similarity algorithm may employ an edit distance measure.

In an embodiment, the distinction indicator may be calculated for each alphanumeric string of the generated identifier record grouping. The alphanumeric string may be split into two letter strings. Similarly, alphanumeric strings associated with a random, representative sample of identifier records within the database may be split into two letter strings. A comparison of the alphanumeric strings from the generated identifier record grouping and the alphanumeric strings associated with the random, representative sample of identifier records within the database yields a similarity score for each record in the identifier record grouping. The similarity score may then be calculated to an inverse mean average of the random, representative sample scores to provide a uniqueness score of the alphanumeric string when compared with all alphanumeric strings associated with identifier records.

At step 235, a value of each of the strength indicators for the generated identifier record grouping can be normalized by a respective global average defined according to values of the strength indicators of the remaining identifier record groupings within the database. The normalization can be a direct comparison of corresponding values.

In an embodiment, the normalization can be performed relative to a scale between 0 and 1. In an embodiment, the normalized values of the one or more strength indicators for the generated identifier record grouping can then be assigned point values according to a degree of difference between the values and the baseline values. For instance, points may be assigned based on a point scale between 1 and 10. In an example, the acquisition of the values of the one or more strength indicators of the remaining identifier record groupings can include acquisition of points assigned for strength indicators of each identifier record grouping within the database.

At step 245, a value of a strength metric for the generated identifier record grouping can be generated/determined. The value of the strength metric may be a summation of the normalized values for each of the one or more strength indicators for the generated identifier record grouping.

At step 255, the strength metric value for the generated identifier record grouping can be ranked amongst corresponding strength metric values for each of the remaining identifier record groupings within the database. An exemplary ranking is shown in FIG. 5.

At step 265, a relative strength of the brand associated with the generated identifier record grouping can be determined based on the ranking determined at step 255. The relative strength may be determined by comparing the strength metric value of the generated identifier record grouping to a highest ranked identifier record grouping of the ranking.

At step 275, based on the ranking and the comparison of the strength metric value of the generated identifier record grouping to the highest ranked identifier record grouping of the ranking, a recommendation of one or more strength indicators of the generated identifier record grouping for improvement can be made. In an embodiment, the recommendation may be made if the comparison of the strength metric values results in a value less than one. In an embodiment, wherein the comparison of the strength metric values results in a value equal to one, meaning that the generated identifier record grouping is the highest ranked strength metric value, no recommendation is made.

In an embodiment, wherein the recommendation is made at step 275, a graphic may be displayed to the user via the user interface of the user device (for example, device 101 in FIG. 1), informing the user of at least one of the one or more strength indicators that can be improved. As described previously, excellence in each of the one or more strength indicators is required to be ranked highly. Similarly, a relative weakness of the generated identifier record grouping can be evaluated in view of normalized values of each of the one or more strength indicators. In this way, and in an example, the recommendation may be to focus on improving a worst performing one of the one or more strength indicators. The recommendation may be, in another example, based on which of the one or more strength indicators may see the most improvement in a short period of time, a recommendation that requires evaluation of company specific capabilities.

As noted, the recommendation may be provided to the user via the user interface of the user device. In this way, immediate feedback is provided to the user regarding the relative strength of the brand.

Figure 3:
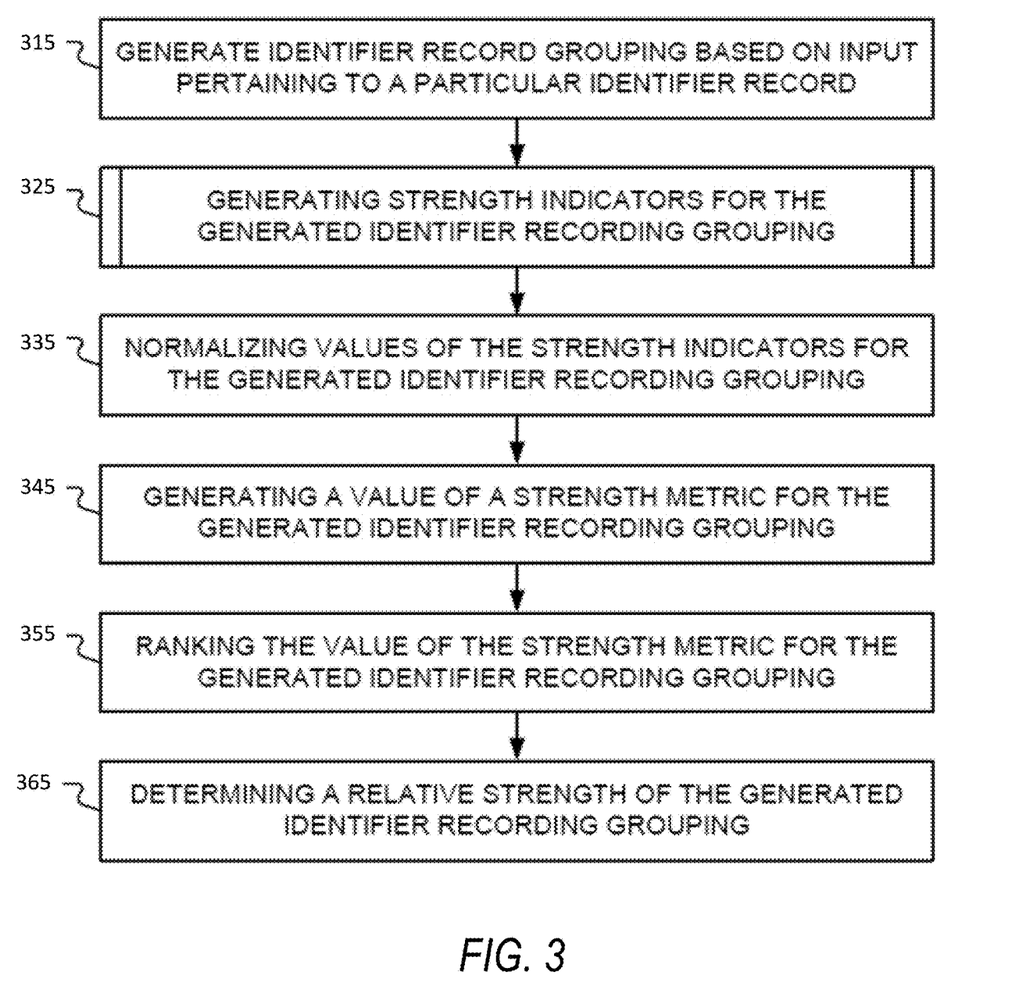
FIG. 3 is a flow diagram of another method of determining a strength score of a brand according to an exemplary embodiment of the present disclosure.

FIG. 3 is a flow diagram of a method for determining a strength score of a brand based on trademark registrations according to an embodiment of the present disclosure. In one embodiment, the method can be performed by the server 103 in FIG. 1. In one embodiment, the method can be performed by the first device 101 or a combination of the first device 101 and the server 103. In the method, a recommendation regarding an area for improvement is not made. Instead, the recommendation can be made by another process outside of the method described herein or may not be made at all. However, the remaining steps and sub processes, as will be outlined below, are substantially the same as those described above with reference to the method in FIG. 2.

In the method of FIG. 3, it is assumed that a user, for instance, has provided input to a user device (for example, the first device 101 of FIG. 1) that indicates a brand for assessment. The input may be a name of a company, a name of a brand, a particular trademark registration, or the like.

The indication of the brand may include identification of a particular identifier record that the user is interested in. The particular identifier record may be a trademark registration such as a textual string in any character set or an image. In an embodiment, it is assumed that the trademark registration is a textual string (e.g., an alphanumeric string), and more than one trademark registration is associated with the trademark registration.

At step 315, an identifier record grouping can be generated based on the particular identifier record. The grouping allows for slightly different but related trademark registrations to be associated with the same brand. For instance, though a variety of trademark registrations may be owned by the same entity, each of the variety of trademark registrations, which can be alphanumeric strings, can have typographical errors and translation errors, as well as minor variations based on regional differences. For instance, corporate suffixes may be different in different regions or jurisdictional areas.

In an embodiment, step 315 can be performed by associating identifier records within a database based on owner names. The association can be performed by using a machine learning algorithm, can be rules based, and can include manual evaluation. Data within the database may be global trademark registration data. The information can include a number of registration classes that the trademarks are registered within in a given jurisdiction, relevant statistics related to an economic output of the given jurisdiction, and market dynamics within the given jurisdiction. The identifier records with similar trademark registrations are grouped to represent the same brand for the purposes of determining a strength score of the brand. In other words, the database may include identifier records associated with unique trademarks registered globally. Accordingly, step 315 allows for grouping of identifier records that pertain to a same brand.

At step 325, one or more strength indicators can be calculated for the generated identifier record grouping. The one or more strength indicators may include a persistence indicator, a market indicator, a jurisdictional indictor, and/or a distinction indicator.

In an embodiment, the persistence indicator may be determined as an average age of trademark registrations associated with the generated identifier record grouping. For instance, for each trademark registration associated with the generated identifier record grouping, a normalized filing date can be created. The normalized filing date considers individual jurisdiction/region/national rules and allows for extraction of a useful actual or estimated date the trademark registration was filed. Next, an average difference between the normalized filing date and the present day may be calculated as the average age of the trademark registration. The calculations may be performed for each identifier record associated with the generated identifier record grouping. Notably, as the persistence indicator relies on the 'present day', a resulting average of trademark registrations associated with the generated identifier record grouping is only valid for the day the calculation is performed.

In an embodiment, the average age of the trademark registrations can be normalized based on average ages of remaining identifier record groupings within the database. Accordingly, after calculating an average age of each of the remaining identifier record groupings within the database (i.e., an average age of every other trademark family in the database), the average age of the generated identifier record grouping can be normalized based on the average ages of the remaining identifier record groupings, and be assigned a score of 0 to 1, accordingly. FIG. 4 provides a graphical illustration of longevity of Google trademark registrations.

In an embodiment, the market indicator may be an economic footprint associated with the generated identifier record grouping and/or an industry footprint associated with the generated identifier record grouping. The economic footprint may be calculated by, first, determining a number of jurisdictions in which the trademarks associated with the generated identifier record grouping are registered, and, second, weighting the determined number of jurisdictions in which the trademarks are registered according to a respective GDP for each of the jurisdictions in which the trademarks are registered. The industry footprint may be determined by, first, calculating a market share of the trademark registrations associated with the generated identifier record grouping, the market share being defined as a percentage of a class of a Nice Classification that the trademark registrations occupy within a given jurisdiction, and, second, calculating the number of different classes of the Nice Classification that the trademarks are registered in within the given jurisdiction.

In an embodiment, the Nice Classifications in each jurisdiction, across all global trademark data, provides a denominator. Accordingly, the market indicator can be calculated by dividing a number of trademark registrations associated with the generated identifier record grouping by a number of existing trademarks registered in a specific class of the Nice Classification in a given jurisdiction. This calculation can be made for every relevant trademark registered in the Nice Classification in a country. This calculation can then be weighted by GDP, as introduced above.

In an embodiment, the jurisdictional indicator can be determined as an indicator of trademark coverage or brand exposure. For instance, for the generated identifier record grouping, a corresponding number of jurisdiction registrations can be calculated. This calculation includes consideration for regional trademark registrations and splitting out distinct coverage of registration for individual member states of the region. The calculated coverage can then be considered as a normalization of the jurisdiction registrations by a total number of possible jurisdictions considered in the database.

In an embodiment, the distinction indicator may be determined as a measure of how distinct an alphanumeric string of an identifier record, or a representative alphanumeric string of the generated identifier record grouping, is relative to other alphanumeric strings associated with other identifier records or other representative alphanumeric strings associated with other identifier record groupings within the database. The measure of the distinction indicator may be, for an alphanumeric string or a representative alphanumeric string, determined by first weighting the string by a length of the string and then calculating a string similarity measure of the string relative to other strings within the database. The string similarity measure may be a string similarity algorithm that may be applied to determine how different given alphanumeric strings, and hence trademark registrations, are from one another. In an example, the string similarity algorithm may be a Jaro-Winkler measure, among other relevant techniques. For instance, the string similarity algorithm may employ an edit distance measure.

In an embodiment, the distinction indicator may be calculated for each alphanumeric string of the generated identifier record grouping. The alphanumeric string may be split into two letter strings. Similarly, alphanumeric strings associated with a random, representative sample of identifier records within the database may be split into two letter strings. A comparison of the alphanumeric strings from the generated identifier record grouping and the alphanumeric strings associated with the random, representative sample of identifier records within the database yields a similarity score for each record in the identifier record grouping. The similarity score may then be calculated to an inverse mean average of the random, representative sample scores to provide a uniqueness score of the alphanumeric string when compared with all alphanumeric strings associated with identifier records.

At step 335, a value of each of the strength indicators for the generated identifier record grouping can be normalized by a respective global average defined according to values of the strength indicators of the remaining identifier record groupings within the database. The normalization can be a direct comparison of corresponding values.

In an embodiment, the normalization can be performed relative to a scale between 0 and 1. In an embodiment, the normalized values of the one or more strength indicators for the generated identifier record grouping can then be assigned point values according to a degree of difference between the values and the baseline values. For instance, points may be assigned based on a point scale between 1 and 10. In an example, the acquisition of the values of the one or more strength indicators of the remaining identifier record groupings can include acquisition of points assigned for strength indicators of each identifier record grouping within the database.

At step 345, a value of a strength metric for the generated identifier record grouping can be generated/determined. The value of the strength metric may be a summation of the normalized values for each of the one or more strength indicators for the generated identifier record grouping.

At step 355, the strength metric value for the generated identifier record grouping can be ranked amongst corresponding strength metric values for each of the remaining identifier record groupings within the database. An exemplary ranking is shown in FIG. 5.

At step 365, a relative strength of the brand associated with the generated identifier record grouping can be determined based on the ranking determined at step 355. The relative strength may be determined by comparing the strength metric value of the generated identifier record grouping to a highest ranked identifier record grouping of the ranking.

In an embodiment, following the ranking of the strength metric values at step 355 or the determination of the relative strength of the brand at step 365, a graphic may be displayed to the user via the user interface of the user device (for example, device 101 of FIG. 1), informing the user of the assessed strength of the brand.

In an embodiment, the ranking and the determined relative strength output from the method in FIG. 3 can then be used by another process, outside the method, to generate and provide and/or display a recommendation of one or more strength indicators of the generated identifier record grouping for improvement. The recommendation may be made if the comparison of the strength metric values results in a value less than one. When the comparison of the strength metric values results in a value equal to one, meaning that the generated identifier record grouping is the highest ranked strength metric value, no recommendation is made. In an embodiment, the recommendation may be to focus on improving a worst performing one of the one or more strength indicators. The recommendation may be, in another example, based on which of the one or more strength indicators may see the most improvement in a short period of time, a recommendation that requires evaluation of company specific capabilities.

According to aspects of the disclosure, the methods described herein can rely on advanced computations and the ability to rapidly process large collections of data. For instance, as it relates to generated the identifier record groupings based on the user input and for each remaining grouping of the database, wherein the identifier record includes a textual string, each record in a live record collection of nearly 80 million must be reviewed and compared against each remaining one of the nearly 80 million live records within the collection. This results in 6,400 trillion calculations. When each identifier record includes an image, a comparison of each individual pixel of each image is required, thereby further amplifying the number of computations required. In response to the magnitude of this effort, the methods of the present disclosure group the 80 million identifier records based on relevancy to other identifier records in the database. This allows for subsequent calculations, including the determination of the one or more strength indicators, to be applied on a subset of the 80 million identifier records. This reduction in computational demand greatly improves the speed of the methodology and allows for greatly expanded implementation. In other words, the embodiments discussed herein provide technological improvements in that they reduce computational demand while improving efficiency and accuracy.

Moreover, the database itself is constantly being updated, requiring the calculations of the present disclosure to be performed daily.

In an embodiment, and as it relates to industry footprint, each identifier record of the 80 million identifier records of the database must be assessed for each Nice Classification covered (which is greater than 1), thereby requiring more than 80 million calculations. Further, a share of the Nice Classification can be calculated based on a distribution of shares across all 80 million identifier records. GDP can be sourced for each of approximately 200 countries and regions around the globe. The industry footprint is normalized, comparing all 80 million identifier records to their distribution on a scale of 0 to 1.

Altogether, it can be appreciated that the creation of strength scores for each identifier record or identifier record grouping creates detailed quantitative information for data points that have historically been qualitative. Related valuation of names and identifiers has relied on output commercial metrics such as revenue, profit, and stock price. The methods described herein reverse that commercial process, relying instead on a technical algorithmic analysis of input variables and their quantification and comparison. Comparator quantitative values are provided versus the historical quantitative information back file, thus highlight variation and proximity in value. Large amounts of data are used to filter and pinpoint areas of similarity or disparity. Further, the methods of the present disclosure allow for assessing the economic activity of a country or region based on the distribution and strength of identifier records (products and companies) as compared with all other identifier records in the database.

Experimental results confirming the utility of the methods described in this disclosure will be described below.

The following empirical results can distinguish a good mark from a less-good mark. This holds true when looking at trademarks of a specific company, in cohorts, or overall.

During validation, all trademarks that contained a verbal element (i.e., image only marks are excluded) are analyzed. The strength indicators described above are calculated for each unique pair of verbal element and owner. Data visualization software (e.g., Tableau, etc.) is used for the computation as it allows for dynamic scoring and ranking based on the cohort selected.

Results are reviewed by a panel of internal experts following iterations.

Regarding the economic footprint, a corresponding metric now includes a PTO weight by GDP, thus correlating the market footprint and trademark registrations. Regarding the industry footprint, and as not all Nice Classifications are equal, a share of a class one registration represents is calculated. Then, all these shares are summed to arrive to a corresponding metric that considers both the number of classes as well as their size.

According to an embodiment, the validation is performed by checking the current iteration of the methods of the present disclosure against an InterBrand 2019 "Best Global Brands". This comparison allows for an assessment of how and whether the purely empirical approach provides correlation to related methodologies.

Results indicated that 27% of the InterBrand 2019 Top 100 are also within the Top 100 determined by the methods of the present disclosure. 43% of the InterBrand 2019 Top 200 are also within the Top 200 determined by the methods of the present disclosure. 50% of the InterBrand 2019 Top 500 are also within the Top 500 determined by the methods of the present disclosure. 66% of the InterBrand 2019 Top 1000 are also within the Top 1000 determined by the methods of the present disclosure. 81% of the InterBrand 2019 Top 2000 are also within the Top 2000 determined by the methods of the present disclosure.

It is noted that various variations of the methods of the present disclosure can be included in the disclosure. In the related arts, the brand valuation methodologies tend to be top down. In contrast, the methods of the present disclosure are independently bottom up and therefore based on a much broader information base. It is also noted that the InterBrand style rankings are biased towards house brands, whereas the methods of the present disclosure can be employed equally well with product brands. Therefore, metrics of the methods of the present disclosure include a much higher volume of individual word trademarks.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be Supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 6:
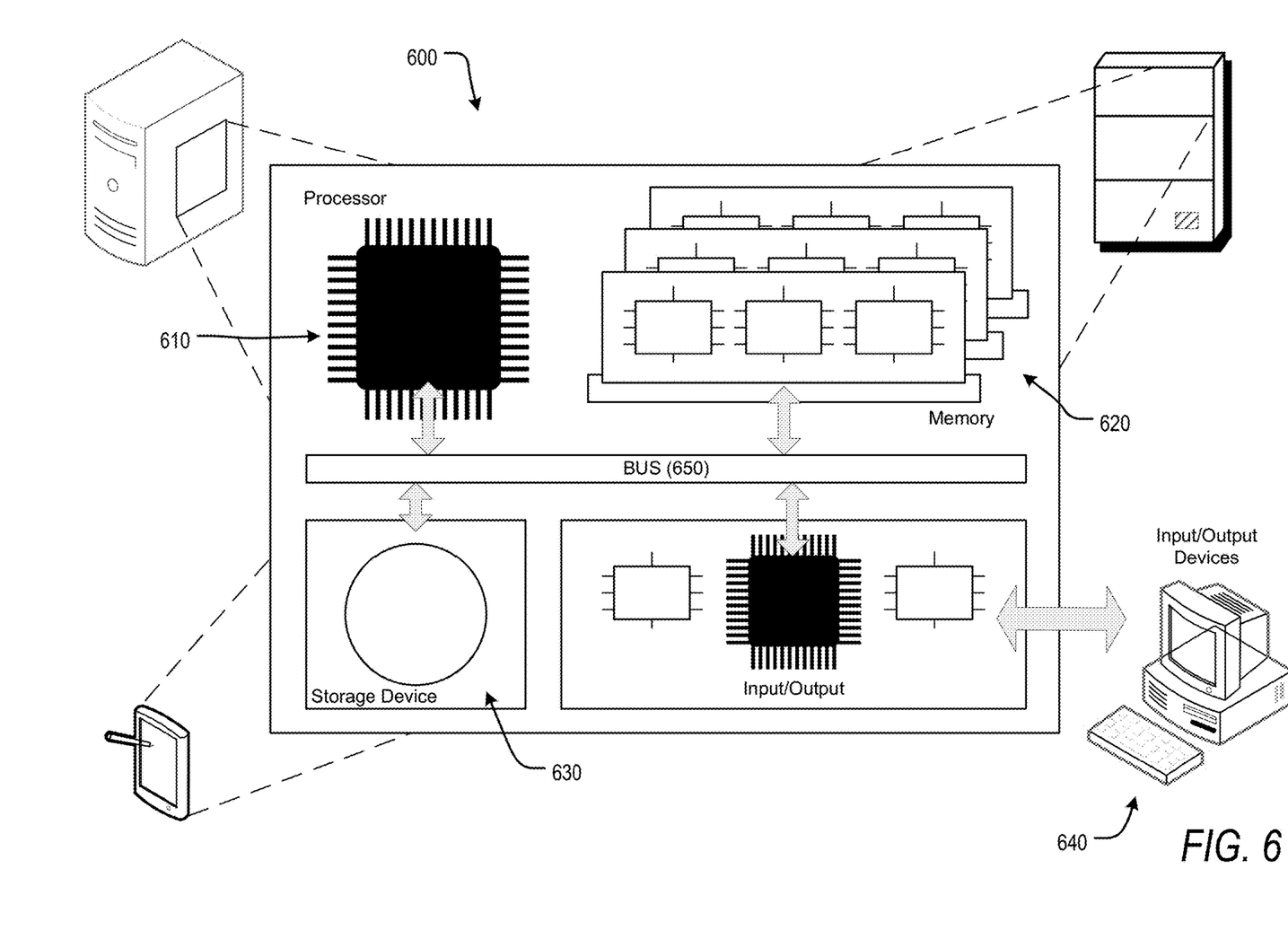
FIG. 6 is a schematic of a hardware configuration of a system for performing a method of determining a strength score of a brand according to an exemplary embodiment of the present disclosure.

An example of one such type of computer is shown in FIG. 6, which shows a schematic diagram of a computer system 600. The system 600 can be used for the operations described in association with any of the computer-implement methods described previously, according to one implementation. In one embodiment, system 600 may correspond to device 101 of FIG. 1. In one embodiment, system 600 may correspond to device 103 of FIG. 1.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces. In another implementation, the input/output device 640 is a user device, such as that described in herein.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An apparatus communicatively coupled with an electronic device via a network, the apparatus comprising:
   processing circuitry configured to:
      generate, from a database, an identifier record grouping including an identifier record and at least one other identifier record, each identifier record in the identifier record grouping being associated with a same brand;
      calculate one or more strength indicators of the generated identifier record grouping, the one or more strength indicators including at least one of a persistence indicator, a market indicator, a jurisdictional coverage indicator, or a distinction indicator;
      normalize a value of each of the one or more strength indicators based on an average value associated with the respective strength indicator, the average value associated with the respective strength indicator being determined based on a plurality of identifier record groupings within the database including the generated identifier record grouping;
      generate a value of a strength metric of the generated identifier record grouping based on a sum of the normalized values of the one or more strength indicators of the generated identifier record grouping;
      rank the value of the strength metric of the generated identifier record grouping amongst values of strength metrics associated with the plurality of identifier record groupings within the database;
      determine a strength score of the generated identifier record grouping as a strength score of the identifier record based on the ranking; and
      determine an improvement recommendation for at least one of the one or more strength indicators of the generated identifier record grouping based on the strength score of the generated identifier record grouping being less than a strength score of a highest ranking identifier record grouping in the plurality of identifier record groupings, the improvement recommendation being displayed by a user interface of the electronic device, wherein
   the processing circuitry is configured to calculate the one or more strength indicators by
      calculating, as the persistence indicator, an average age of trademark registrations associated with the generated identifier record grouping,
      calculating, as the market indicator, at least one of an economic footprint of the generated identifier record grouping or an industry footprint of the generated identifier record grouping,
      calculating, as the jurisdictional coverage indicator, a number of registered jurisdictions normalized by a total number of jurisdictions within the database, or
      calculating, as the distinction indicator, a distinctiveness of a representative identifier record of the generated identifier record grouping.

2. The apparatus of claim 1, wherein the identifier record is determined based on an input from the electronic device.

3. The apparatus of claim 2, wherein the input is a textual string or an image.

4. The apparatus of claim 1, wherein trademarks associated with the generated identifier record grouping are registered in the number of registered jurisdictions.

5. The apparatus of claim 1, wherein the economic footprint of the generated identifier record grouping is determined by
   weighting the number of registered jurisdictions based on a respective gross domestic product for each of the registered jurisdictions.

6. The apparatus of claim 1, wherein the industry footprint of the generated identifier record grouping is determined by
   calculating a market share of the generated identifier record grouping, the market share being defined as a percentage of a class of a Nice Classification that the trademarks associated with the generated identifier record grouping occupy within a given jurisdiction, and
   calculating a number of different classes of the Nice Classification that the trademarks associated with the generated identifier record grouping are registered in within the given jurisdiction.

7. The apparatus of claim 1, wherein the representative identifier record is associated with a textual string and the distinctiveness of the representative identifier record of the generated identifier record grouping is determined by
weighting the representative identifier record by a length of the associated textual string, and
calculating a string similarity measure of the associated textual string relative to other textual strings associated with other identifier records within the database, the other identifier records within the database being identifier records not associated with the generated identifier record grouping.

8. A method for determining a strength score of an identifier record, comprising:
generating, by processing circuitry of a server and from a database, an identifier record grouping including the identifier record and at least one other identifier record, each identifier record in the identifier record grouping being associated with a same brand;
calculating, by the processing circuitry of the server, one or more strength indicators of the generated identifier record grouping, the one or more strength indicators including at least one of a persistence indicator, a market indicator, a jurisdictional coverage indicator, or a distinction indicator;
normalizing, by the processing circuitry of the server, a value of each of the one or more strength indicators based on an average value associated with the respective strength indicator, the average value associated with the respective strength indicator being determined based on a plurality of identifier record groupings within the database including the generated identifier record grouping;
generating, by the processing circuitry of the server, a value of a strength metric of the generated identifier record grouping based on a sum of the normalized values of the one or more strength indicators of the generated identifier record grouping;
ranking, by the processing circuitry of the server, the value of the strength metric of the generated identifier record grouping amongst values of strength metrics associated with the plurality of identifier record groupings within the database;
determining, by the processing circuitry of the server and based on the ranking, a strength score of the generated identifier record grouping as the strength score of the identifier record; and
determining, by the processing circuitry of the server, an improvement recommendation for at least one of the one or more strength indicators of the generated identifier record grouping based on the strength score of the generated identifier record grouping being less than a strength score of a highest ranking identifier record grouping in the plurality of identifier record groupings, the improvement recommendation being displayed by a user interface of an electronic device communicatively coupled with the server via a network, wherein
the calculating the one or more strength indicators includes
calculating, as the persistence indicator, an average age of trademark registrations associated with the generated identifier record grouping,
calculating, as the market indicator, at least one of an economic footprint of the generated identifier record grouping or an industry footprint of the generated identifier record grouping,
calculating, as the jurisdictional coverage indicator, a number of registered jurisdictions normalized by a total number of jurisdictions within the database, or
calculating, as the distinction indicator, a distinctiveness of a representative identifier record of the generated identifier record grouping.

9. The method of claim 8, wherein the identifier record is determined based on an input from an electronic device.

10. The method of claim 9, wherein the input is a textual string or an image.

11. The method of claim 8, wherein trademarks associated with the generated identifier record grouping are registered in the number of registered jurisdictions.

12. The method of claim 8, wherein the economic footprint of the generated identifier record grouping is determined by
weighting, by the processing circuitry of the server, the number of registered jurisdictions based on a respective gross domestic product for each of the registered jurisdictions.

13. The method of claim 11, wherein the industry footprint of the generated identifier record grouping is determined by
calculating, by the processing circuitry of the server, a market share of the generated identifier record grouping, the market share being defined as a percentage of a class of a Nice Classification that the trademarks associated with the generated identifier record grouping occupy within a given jurisdiction, and
calculating, by the processing circuitry of the server, a number of different classes of the Nice Classification that the trademarks associated with the generated identifier record grouping are registered in within the given jurisdiction.

14. The method of claim 8, wherein the representative identifier record is associated with a textual string and the distinctiveness of the representative identifier record of the generated identifier record grouping is determined by
weighting, by the processing circuitry of the server, the representative identifier record by a length of the associated textual string, and
calculating, by the processing circuitry of the server, a string similarity measure of the associated textual string relative to other textual strings associated with other identifier records within the database, the other identifier records within the database being identifier records not associated with the generated identifier record grouping.

15. A non-transitory computer-readable storage medium storing computer-readable instructions that, when executed by a computer for determining a strength score of an identifier record, cause the computer to perform:
generating, from a database, an identifier record grouping including the identifier record and at least one other identifier record, each identifier record in the identifier record grouping being associated with a same brand;
calculating one or more strength indicators of the generated identifier record grouping, the one or more strength indicators including at least one of a persistence indicator, a market indicator, a jurisdictional coverage indicator, or a distinction indicator;
normalizing a value of each of the one or more strength indicators based on an average value associated with the respective strength indicator, the average value associated with the respective strength indicator being determined based on a plurality of identifier record groupings within the database including the generated identifier record grouping;

generating a value of a strength metric of the generated identifier record grouping based on a sum of the normalized values of the one or more strength indicators of the generated identifier record grouping;

ranking the value of the strength metric of the generated identifier record grouping amongst values of strength metrics associated with the plurality of identifier record groupings within the database;

determining a strength score of the generated identifier record grouping as the strength score of the identifier record based on the ranking; and determining an improvement recommendation for at least one of the one or more strength indicators of the generated identifier record grouping based on the strength score of the generated identifier record grouping being less than a strength score of a highest ranking identifier record grouping in the plurality of identifier record groupings, the improvement recommendation being displayed by a user interface of an electronic device, wherein the calculating the one or more strength indicators includes calculating, as the persistence indicator, an average age of trademark registrations associated with the generated identifier record grouping, calculating, as the market indicator, at least one of an economic footprint of the generated identifier record grouping or an industry footprint of the generated identifier record grouping, calculating, as the jurisdictional coverage indicator, a number of registered jurisdictions normalized by a total number of jurisdictions within the database, or calculating, as the distinction indicator, a distinctiveness of a representative identifier record of the generated identifier record grouping.

\* \* \* \* \*